(12) United States Patent
Philippe et al.

(10) Patent No.: US 10,827,179 B2
(45) Date of Patent: Nov. 3, 2020

(54) METHOD FOR CODING AND DECODING IMAGE PARAMETERS, DEVICE FOR CODING AND DECODING IMAGE PARAMETERS AND COMPUTER PROGRAMS CORRESPONDING THERETO

(71) Applicant: ORANGE, Paris (FR)

(72) Inventors: Pierrick Philippe, Chatillon (FR); Kevin Reuze, Chatillon (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 16/343,625

(22) PCT Filed: Oct. 16, 2017

(86) PCT No.: PCT/FR2017/052840
§ 371 (c)(1),
(2) Date: Apr. 19, 2019

(87) PCT Pub. No.: WO2018/073522
PCT Pub. Date: Apr. 26, 2018

(65) Prior Publication Data
US 2019/0335180 A1 Oct. 31, 2019

(30) Foreign Application Priority Data
Oct. 21, 2016 (FR) .................................. 16 60251

(51) Int. Cl.
*H04N 19/136* (2014.01)
*H04N 19/103* (2014.01)
(Continued)

(52) U.S. Cl.
CPC ......... *H04N 19/136* (2014.11); *H04N 19/103* (2014.11); *H04N 19/157* (2014.11); *H04N 19/463* (2014.11)

(58) Field of Classification Search
CPC .. H04N 19/136; H04N 19/103; H04N 19/157; H04N 19/463
(Continued)

(56) References Cited

U.S. PATENT DOCUMENTS

2012/0328012 A1* 12/2012 Sasai .................... H04N 19/109
375/240.12
2014/0210652 A1* 7/2014 Bartnik ................... H03M 7/40
341/67

FOREIGN PATENT DOCUMENTS

WO 2014162749 A1 10/2014
WO WO-2014162749 A1 * 10/2014 ............. H04N 19/13

OTHER PUBLICATIONS

English translation of the Written Opinion of the International Searching Authority dated Nov. 30, 2017 for corresponding International Application No. PCT/FR2017/052840, filed Oct. 16, 2017.
(Continued)

*Primary Examiner* — Nguyen T Truong
(74) *Attorney, Agent, or Firm* — David D. Brush; Westman, Champlin & Koehler, P.A.

(57) ABSTRACT

A method and device for coding at least one current image parameter, wherein, in relation to a zone of a current image, the method implements the following: as a function of the value of at least one parameter of an image zone which precedes that zone of the current image, selecting a scheme for coding the at least one current image parameter, from among at least two predetermined coding schemes, and coding the value of the at least one current image parameter with the aid of the selected coding scheme.

8 Claims, 10 Drawing Sheets

(51) Int. Cl.
*H04N 19/157* (2014.01)
*H04N 19/463* (2014.01)

(58) Field of Classification Search
USPC .................................................. 375/240.02
See application file for complete search history.

(56) References Cited

OTHER PUBLICATIONS

International Search Report dated Nov. 30, 2017 for corresponding International Application No. PCT/FR2017/052840, filed Oct. 16, 2017.
Written Opinion of the International Searching Authority dated Nov. 30, 2017 for corresponding International Application No. PCT/FR2017/052840, filed Oct. 16, 2017.
HEVC standard "ISO/IEC/23008-2 ITU-T Recommendation H.265 High Efficiency Video Coding (HEVC)", Apr. 2013.

* cited by examiner

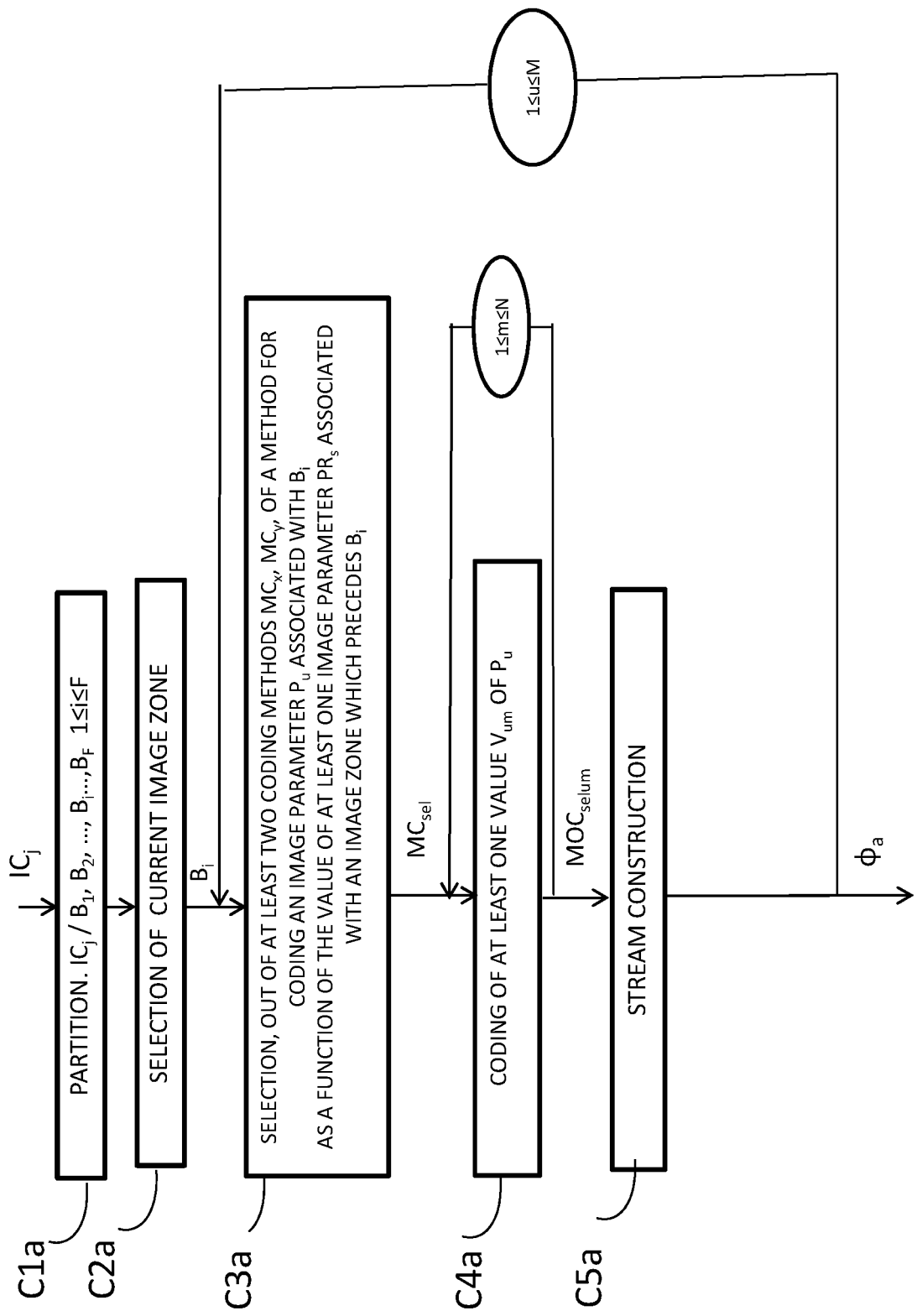

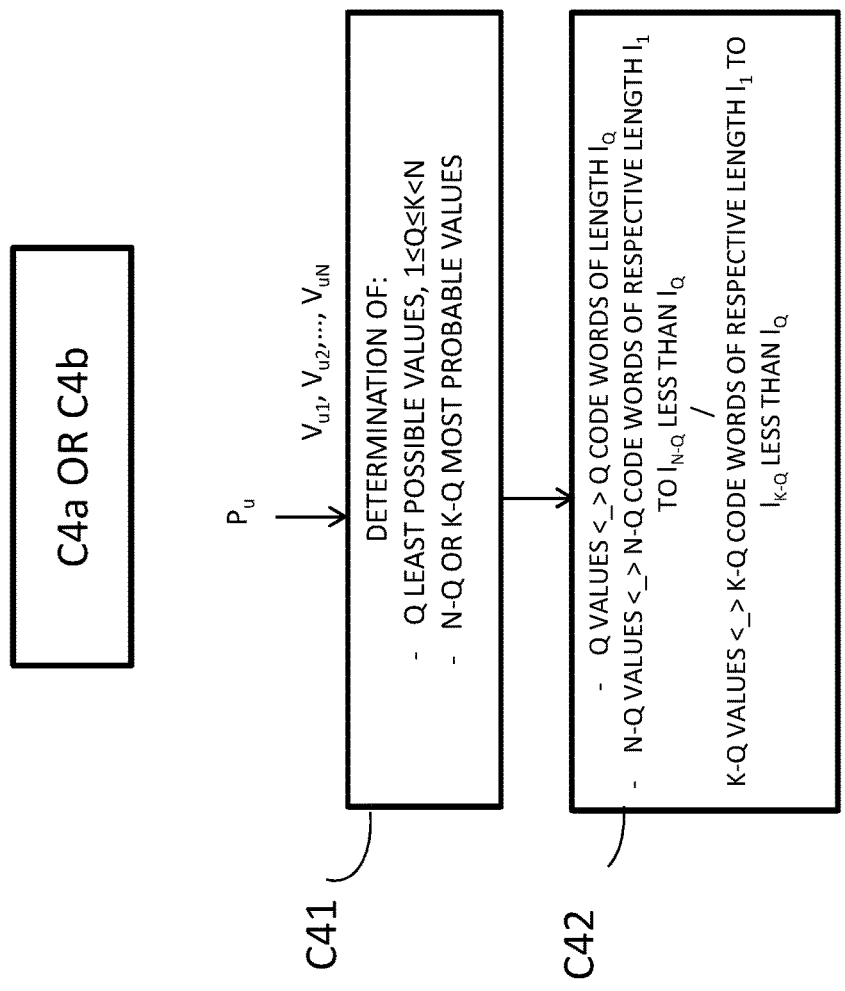

METHOD FOR CODING AND DECODING IMAGE PARAMETERS, DEVICE FOR CODING AND DECODING IMAGE PARAMETERS AND COMPUTER PROGRAMS CORRESPONDING THERETO

CROSS-REFERENCE TO RELATED APPLICATIONS

This Application is a Section 371 National Stage Application of International Application No. PCT/FR2017/052840, filed Oct. 16, 2017, which is incorporated by reference in its entirety and published as WO 2018/073523 A1 on Apr. 6, 2018, not in English.

FIELD OF THE INVENTION

The present invention relates generally to the field of image processing, and more specifically to the coding and the decoding of digital image parameters, whether these digital images are fixed or form part of a sequence of digital images.

The coding/decoding of such image parameters is applied in particular to images deriving from at least one video sequence comprising:
images from one and the same camera and following one another temporally (2D type coding/decoding),
images from different cameras oriented according to different views (3D type coding/decoding),
corresponding texture and depth components (3D type coding/decoding),
etc.

The present invention applies likewise to the coding/decoding of 2D or 3D type image parameters.

The invention can particularly, but not exclusively, be applied to the video coding implemented in current AVC and HEVC video coders and their extensions (MVC, 3D-AVC, MV-HEVC, 3D-HEVC, etc.), and to the corresponding decoding.

PRIOR ART

The current video coders (MPEG, H.264, HEVC, . . . ) use a blockwise representation of the video sequence. The images are subdivided into blocks, which can to be re-subdivided recursively.

For a current block to be coded, the image parameters associated with this block are coded in the form of bits using a suitable coding method implemented by a coder, such as, for example, an entropic coder, the aim of which is to code these parameters losslessly.

Such parameters are, for example:
the residual prediction coefficients of the pixels of the current block,
the prediction mode (intra prediction, inter prediction, default prediction, producing a prediction for which no information is transmitted to the decoder ("skip")),
information specifying the type of prediction (orientation, reference image, etc.),
the type of subdivision of the current block,
the motion information if necessary,
etc.

The bits obtained after entropic coding are written into a data stream which is intended to be transmitted to the decoder.

Once the stream has been received by the decoder, the decoding is done image by image, and, for each image, block by block. For each block, the bits representative of the image parameters associated with the block are read, then decoded using a decoding method implemented by a decoder, for which the truth table is the same as that of the coder.

For an image parameter of the abovementioned type associated with a current block, such as, for example, the intra prediction mode, HEVC (abbreviation of "High Efficiency Video Coding") standard proposes coding such a prediction mode by predicting the value of this mode in relation to:
the value of the intra prediction mode of a block A situated above the current block and which has already been coded,
the value of the intra prediction mode of a block B situated to the left of the current block and which has already been coded.

To this end, the values of the intra prediction modes of the block A and of the block B are first of all tested using a decision tree to determine three most probable intra prediction mode values MPM (abbreviation of "Most Probable Mode") for the block to be coded, out of the thirty-five possible values of the intra mode as proposed in the HEVC standard.

Such a decision tree is represented in FIG. 1. According to the values of the intra prediction mode of the block A and of the intra prediction mode of the block B, the decision tree makes it possible to determine the three most probable intra prediction modes, according to five different ways represented respectively by the five lowest leaves F1, F2, F3, F4, F5 of the tree.

Thus:
the leaf F1 associates with the intra prediction mode of the current block the following three most probable values:
$MPM_0$=intra prediction mode of the block A,
$MPM_1$=intra prediction mode of the block B,
$MPM_3$=HEVC intra prediction mode no. 1
the leaf F2 associates with the intra prediction mode of the current block the following three most probable values:
$MPM_0$-intra prediction mode of the block A,
$MPM_1$=intra prediction mode of the block B,
$MPM_3$=HEVC intra prediction mode no. 26
the leaf F3 associates with the intra prediction mode of the current block the following three most probable values:
$MPM_0$-intra prediction mode of the block A,
$MPM_1$=intra prediction mode of the block B,
$MPM_3$=HEVC intra prediction mode no. 0 (Planar)
the leaf F4 associates with the intra prediction mode of the current block the following three most probable values:
$MPM_0$-HEVC intra prediction mode no. 0 (Planar),
$MPM_1$-HEVC intra prediction mode no. 1,
$MPM_3$=HEVC intra prediction mode no. 26
the leaf F5 associates with the intra prediction mode of the current block the following three most probable values:
$MPM_0$=intra prediction mode of the block A,
$MPM_1$=intra prediction mode of the block A−1,
$MPM_3$=intra prediction mode of the block A+1.

For each of the five leaves, the selected prediction mode is coded, the respective values of the thirty-five intra prediction modes being coded in the following same way:
the value of the first most probable intra prediction mode $MPM_0$ is coded on two bits,
the value of the second most probable intra prediction mode $MPM_1$ is coded on three bits,
the value of the third most probable intra prediction mode $MPM_2$ is coded on three bits, the value of the each of the remaining thirty-two prediction modes $MPM_3$ to $MPM_{34}$ is coded on six bits.

An example of signaling scheme is described in the table below:

| Most probable intra prediction mode | Code word | Length (bits) |
|---|---|---|
| $MPM_0$ | 00 | 2 |
| $MPM_1$ | 010 | 3 |
| $MPM_2$ | 011 | 3 |
| $MPM_3$ | 100000 | 6 |
| $MPM_4$ | 100001 | 6 |
| $MPM_5$ | 100010 | 6 |
| ... | ... | ... |
| $MPM_{34}$ | 111111 | 6 |

Such a method for coding the intra prediction mode which codes on fewer bits the values of the first most probable intra prediction modes relative to the values of the less probable intra prediction modes allows for a reduction of the signaling cost, the obtained average number of bits to be transmitted having been assessed at 4.01 bits. In order to further reduce the signaling cost, provision is made, according to the HEVC standard, to apply a CABAC (abbreviation of "Context Adaptive Binary Arithmetic Coding") coding to one or more of the constituent bits of the associated code words. The obtained average number of bits to be transmitted is thus reduced to 3.95 bits.

The drawback with such a technique for coding the image parameters is that the binary sequence which results therefrom remains costly to signal. Thus, it does not make it possible to optimize the reduction of the compression gain of the coded data. This results in compression performance levels which are not satisfactory.

Object and Summary of the Invention

One of the aims of the invention is therefore to remedy inadequacies/drawbacks of the state of the art and/or to provide improvements thereto.

To this end, one object of the present invention relates to a method for coding at least one current image parameter, characterized in that, relative to a zone of a current image, it implements the following:
as a function of the value of at least one parameter of an image zone which precedes the zone of the current image, selection of a method for coding the at least one current image parameter, out of at least two predetermined coding methods,
coding of the value of the at least one current image parameter using the selected coding method.

Such a provision makes it possible, by taking account of certain characteristics of the image in which the current image zone is situated or else certain characteristics of another image which contains a reference image zone corresponding to the current image zone, and by proposing at least two different methods for coding an image parameter associated with the current image zone:
to code this parameter according to a sequence of data that is less costly than that obtained in the state of the art,
to adapt as faithfully as possible the code word and/or words respectively to the value and/or values of the image parameter, as a function of the spatial or temporal vicinity of the current image zone.

According to a particular embodiment, N possible values being associated with said at least one current image parameter, such as N≥2, the predetermined coding method which is selected matches K code words respectively to K values out of N, such as K<N.

Such a provision makes it possible, for a selected coding method out of at least two, to code an image parameter that can take N possible values, according to only K code words, such as K<N, which has the advantage of optimizing the reduction of the signaling cost.

According to another particular embodiment, N possible values being associated with said at least one current image parameter, such as N≥2:
Q code words all having the same length are associated respectively with some Q possible values out of N of said at least one current image parameter, such as Q<N,
N−Q or K−Q code words, of respective length less than that of the Q code words, are associated respectively with the N−Q or K−Q possible remaining values of said at least one current image parameter.

Such a provision makes it possible to further reduce the cost of signaling of the N code words associated respectively with the N coded values of an image parameter, by assigning, to the most probable values of the image parameter, code words of length less than that of the code words associated with the least probable values of the image parameter.

This reduction is further accompanied by an estimation of the bit rate that is easier to calculate given the fact that the least probable values of the image parameter are associated with code words which are of the same length.

Such a provision therefore reduces the complexity of the coder in terms of computation resources.

The abovementioned various embodiments or features can be added, independently or in combination with one another, to the steps of the coding method as defined above.

The invention relates also to a device for coding at least one current image parameter, comprising a processing circuit, characterized in that it is arranged to, relative to a zone of a current image:
as a function of the value of at least one parameter of an image zone which precedes said zone of the current image, select a method for coding said at least one current image parameter, out of at least two predetermined coding methods,
code the value of said at least one current image parameter using the selected coding method.

Such a coding device is particularly suitable for implementing the abovementioned coding method.

The invention relates also to a method for decoding at least one current image parameter, characterized in that, relative to a zone of a current image, it implements the following:
as a function of the value of at least one parameter of an image zone which precedes the zone of the current image, selection of a method for decoding the at least one current image parameter, out of at least two predetermined decoding methods,
decoding of the value of the at least one current image parameter using the selected decoding method.

According to a particular embodiment, N possible values being associated with said at least one current image parameter, such as N≥2, the predetermined decoding method which is selected matches K code words respectively to K values out of N, such as K<N.

According to another particular embodiment, N possible values being associated with said at least one current image parameter, such as N≥2:

Q code words all having the same length are associated respectively with some Q possible values out of N of said at least one current image parameter, such as Q<N, N−Q or K−Q code words, of respective length less than that of the Q code words, are associated respectively with the N−Q or K−Q possible remaining values of said at least one current image parameter.

The abovementioned various embodiments or features can be added, independently or in combination with one another, to the steps of the decoding method as defined above.

The invention relates also to a device for decoding at least one current image parameter, comprising a processing circuit, characterized in that it is arranged to, relative to a zone of a current image:
- as a function of the value of at least one parameter of an image zone which precedes said zone of the current image, select a method for decoding said at least one current image parameter, out of at least two predetermined decoding methods,
- decode the value of said at least one current image parameter using the selected decoding method.

Such a decoding device is particularly suitable for implementing the abovementioned decoding method.

The invention relates also to a computer program comprising instructions for implementing one of the coding and decoding methods according to the invention, when it is run on a computer.

This program can use any programming language, and be in the form of source code, object code, or intermediate code between source code and object code, such as in a partially compiled form, or in any other desirable form.

The invention also targets a computer-readable storage medium on which is stored a computer program, this program comprising instructions suitable for implementing one of the coding or decoding methods according to the invention, as described above.

The invention also targets a computer-readable storage medium on which is stored a computer program, this program comprising instructions suitable for implementing the coding or decoding method according to the invention, as described above.

The storage medium can be any entity or device capable of storing the program. For example, the medium can comprise a storage means, such as ROM, for example a CD ROM or a microelectronic circuit ROM, a USB key or even a magnetic storage means, for example a hard disk.

Also, the storage medium can be a transmissible medium such as an electrical or optical signal, which can be routed via an electrical or optical cable, wirelessly or by other means. The program according to the invention can in particular be downloaded over a network of Internet type.

Alternatively, the storage medium can be an integrated circuit in which the program is incorporated, the circuit being adapted to execute or to be used in the execution of the abovementioned coding or decoding method.

BRIEF DESCRIPTION OF THE DRAWINGS

Other features and advantages will become apparent on reading about several preferred embodiments described with reference to the figures in which:

FIG. 2A represents the main steps of the method for coding an image parameter according to a first embodiment of the invention, FIG. 2C represents an example of coding method applied to several values of an image parameter.

DETAILED DESCRIPTION OF THE CODING PART

An embodiment of the invention will now be described, in which the coding method according to the invention is used to code an image parameter according to a bit stream close to that which is obtained by a coding according to any one of the current or future video coding standards.

Figure 1:
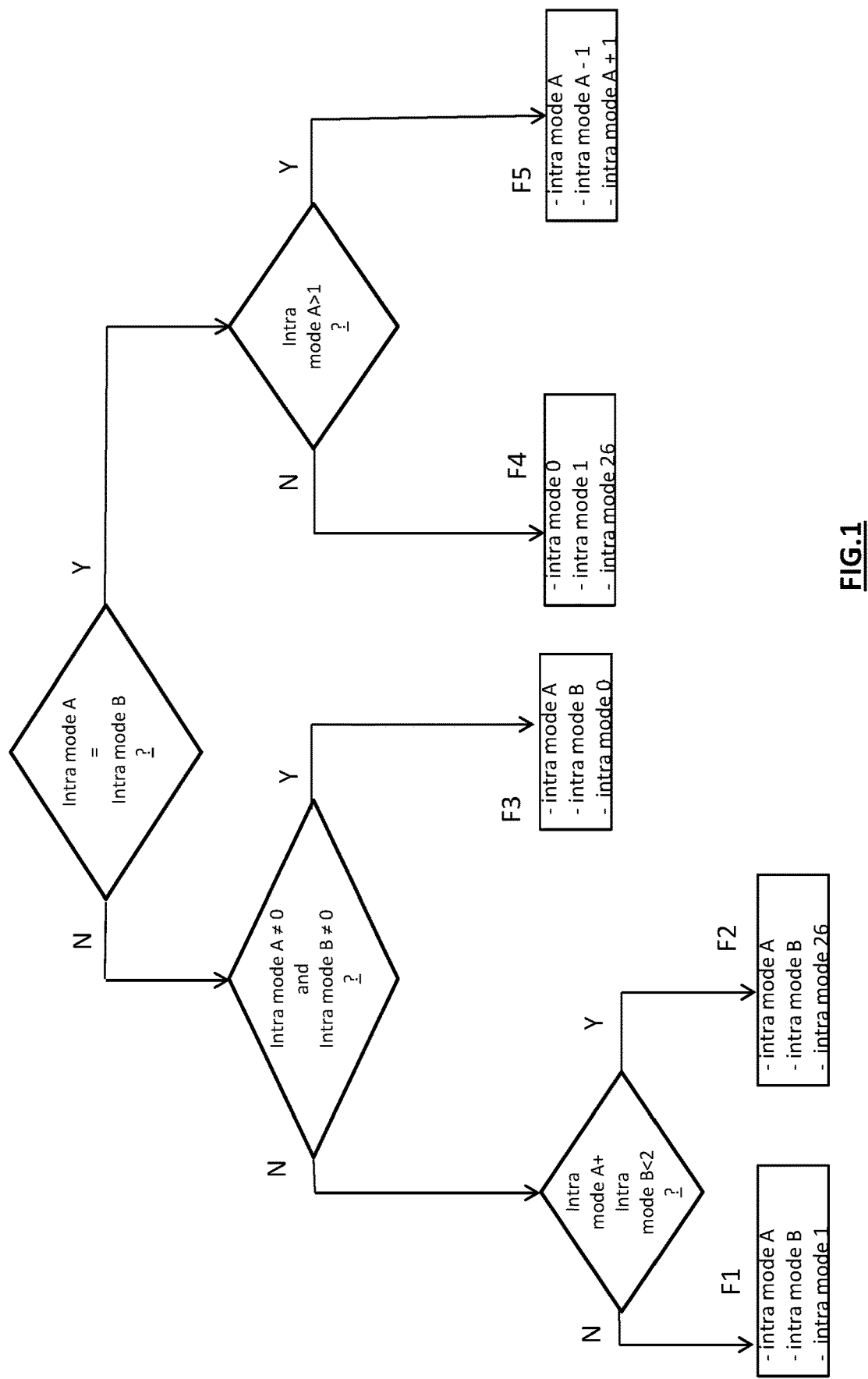
FIG. 1 represents an example of determination according to the state of the art of the most probable values of an image parameter of a current image zone, taking into account the spatial vicinity of the current image zone.
Figure 2B:
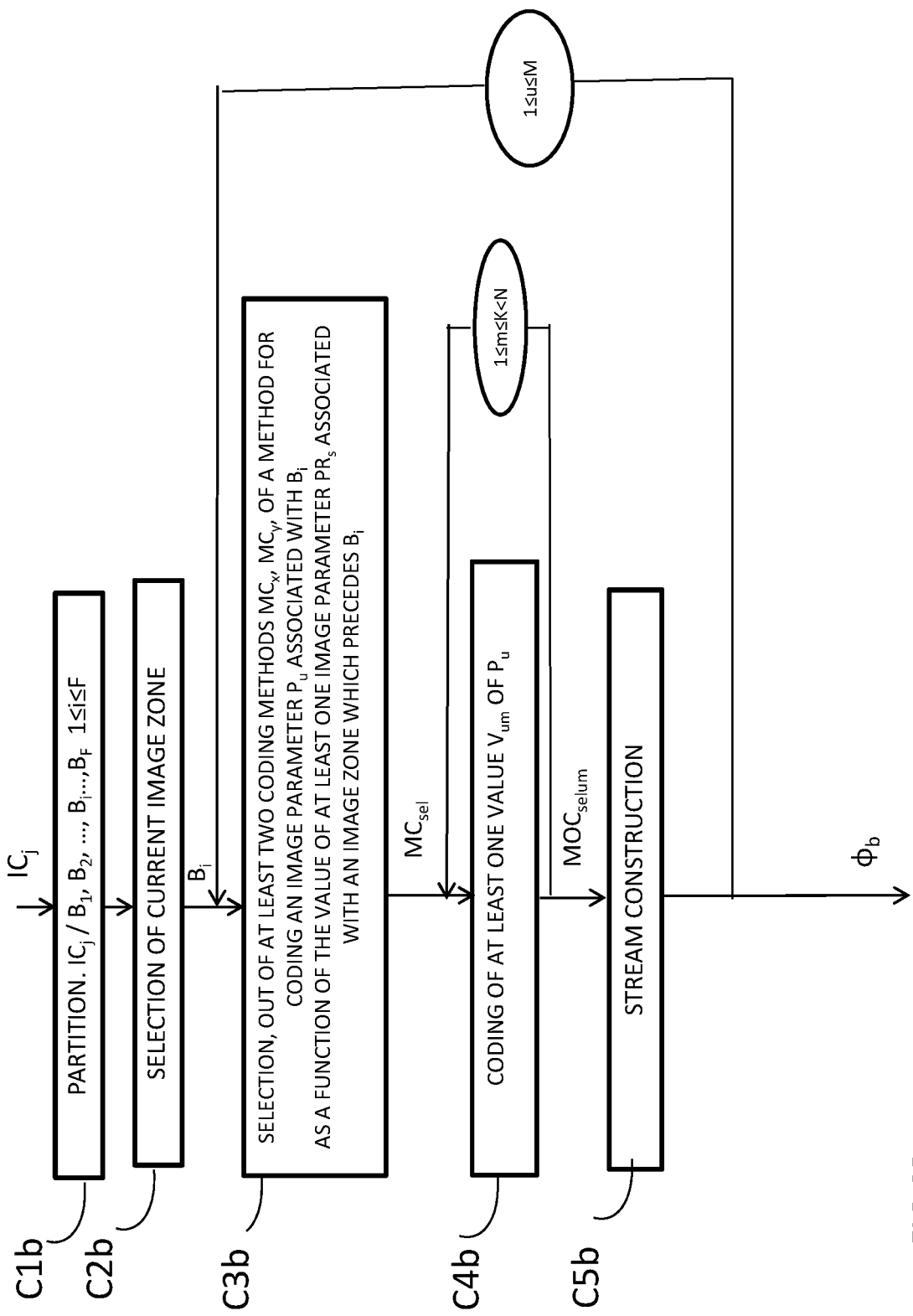
FIG. 2B represents the main steps of the method for coding an image parameter according to a second embodiment of the invention.

In this embodiment, the coding method according to the invention is for example implemented by software or hardware through modifications of a coder initially conforming to one of said standards. The coding method according to the invention is represented in the form of an algorithm comprising steps C1a to C5a as represented in FIG. 2A or else steps C1b to C5b as represented in FIG. 2B.

Figure 3:
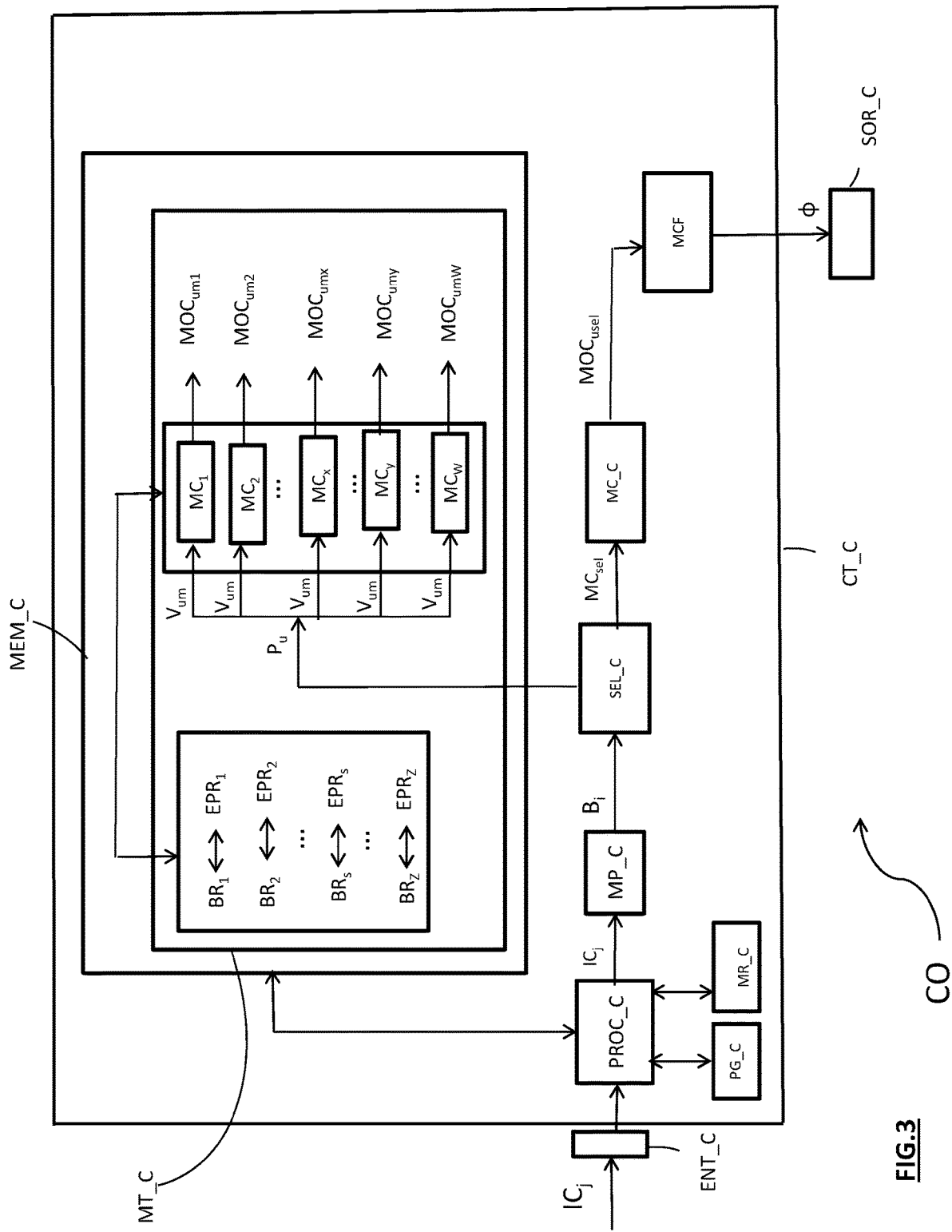
FIG. 3 represents an embodiment of a coder implementing an image parameter coding method according to FIG. 2A, 2B or 2C.

According to the embodiment of the invention, the coding method according to the invention is implemented in a coding device CO represented in FIG. 3.

As illustrated in FIG. 3, such a coder device comprises:
- an input ENT_C for receiving a current image to be coded,
- a processing circuit CT_C for implementing the coding method according to the invention, the processing circuit CT_C containing:
  - a memory MEM_C comprising a buffer memory MT_C,
  - a processor PROC_C driven by a computer program PG_C,
- an output SOR_C for delivering a coded signal or stream containing the data obtained from the coding of the current image parameter.

On initialization, the code instructions of the computer program PG_C are for example loaded into a RAM memory, MR_C, before being executed by the processing circuit CT_C.

The coding method represented in FIG. 2A or 2B is applied to any parameter associated with a current image $IC_j$ to be coded which can be a fixed image or else an image forming part of a sequence of images $IC_1$, $IC_2$, ..., $IC_j$, ..., $IC_G$, ($1 \leq j \leq G$), some of these images being coded in relation to others.

During a step C1a represented in FIG. 2A, a current image $IC_j$ is partitioned, in a way known per se, into a plurality of image zones $B_1, B_2, \ldots, B_i, \ldots, B_F$ ($1 \leq i \leq F$). Such a partitioning step is implemented by a partitioning device MP_C represented in FIG. 3, which device is driven by the processor PROC_C.

According to an exemplary embodiment, said zones are blocks.

It should be noted that, within the meaning of the invention, the term "block" means coding unit. The latter terminology is used in particular in the HEVC standard "ISO/IEC/23008-2 ITU-T Recommendation H.265 High Efficiency Video Coding (HEVC)".

In particular, such a coding unit groups together sets of pixels of rectangular or square form, also called blocks or macroblocks.

Such a coding unit could, in a future standard, also group together sets of pixels having other geometrical forms.

According to another exemplary embodiment, the zones of the image are matched to the local characteristics of the image, such as, for example, a uniform texture, a constant motion, an object in the foreground in the image, etc.

Said zones $B_1, B_2, \ldots, B_1, \ldots, B_F$ are intended to be coded according to a predetermined order of progress, which is for example of the lexycographical type. That means that the zones are coded one after the other, from left to right then from top to bottom.

Other types of progress are of course possible. Thus, it is possible to subdivide the image $IC_j$ into several subimages called slices and to independently apply a subdividing of this type to each subimage. It is also possible to code not a succession of rows, as explained above, but a succession of columns. It is also possible to cover the lines or columns in one direction or in the other.

Each image zone can moreover be itself subdivided into subzones which can themselves be subdivided.

During a step C2a represented in FIG. 2A, the coder CO selects as current image zone a first zone to be coded $B_i$ of the image $IC_j$, such as, for example, the first zone $B_1$.

Figure 4A:
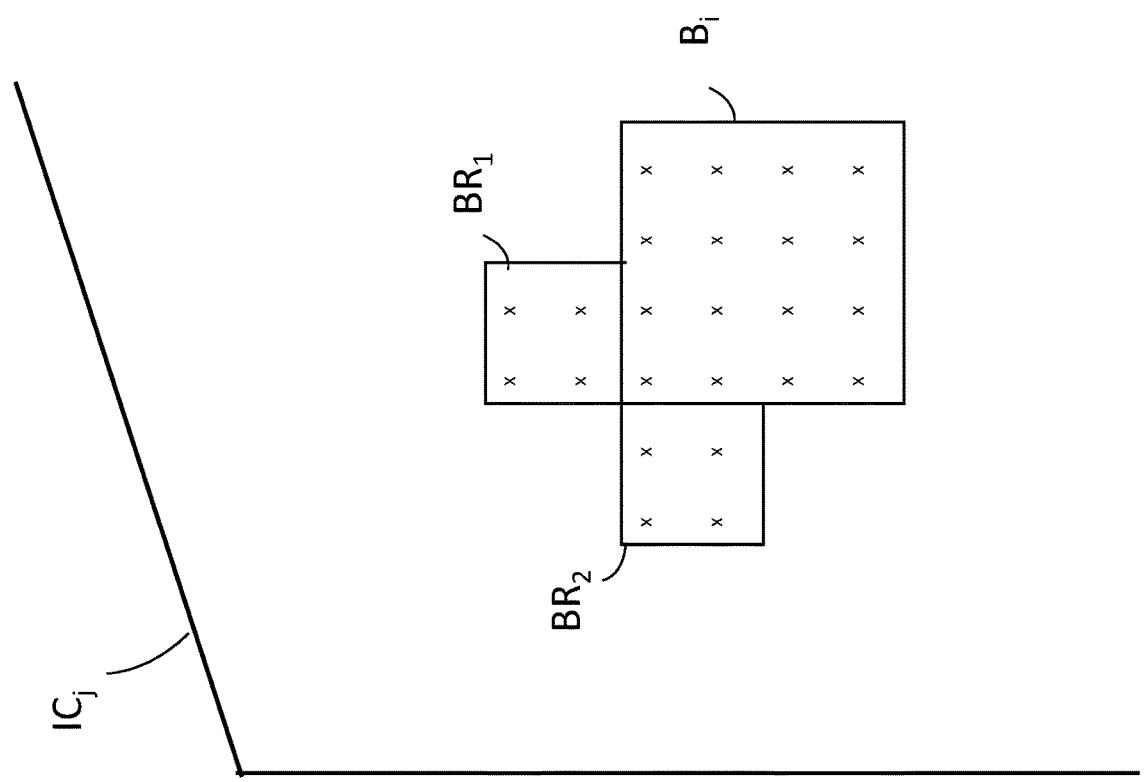
FIG. 4A represents a first example of image zone preceding a current image zone.
Figure 4B:
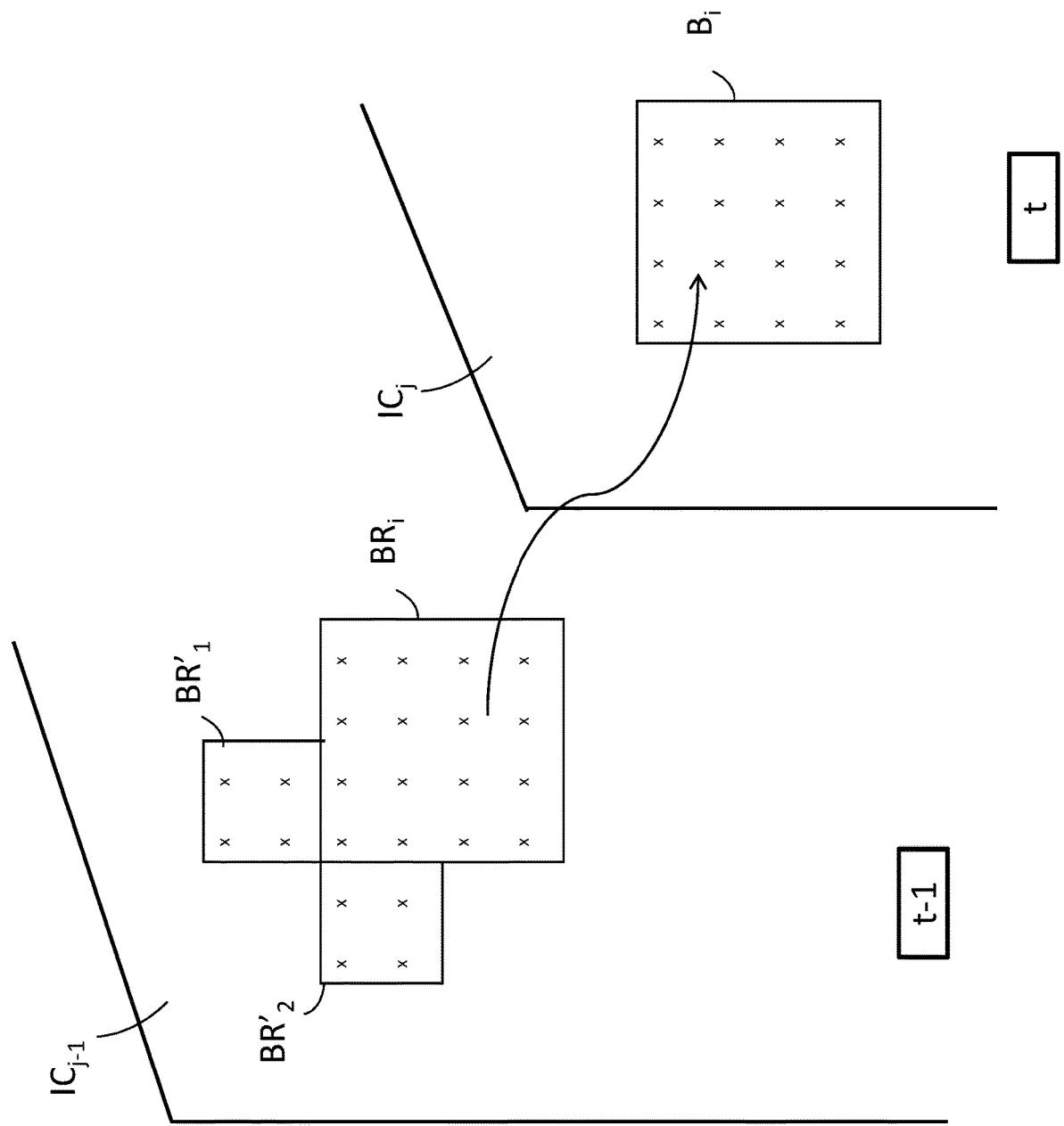
FIG. 4B represents a second example of image zone preceding a current image zone.

In the example represented in FIG. 4A or 4B, the current image zone B is a block of 8×8 pixel size.

Conventionally, the current image zone $B_i$ is associated with a plurality of image parameters $P_1, P_2, \ldots, P_u, \ldots, P_M$, such as $1 \leq u \leq M$.

Such parameters are for example:
the residual prediction coefficients of the pixels of the current image zone if the latter is predicted in accordance with a given prediction mode,
the values of pixels constituting the current image zone considered as such or through a characteristic computation operation such as, for example, the average or the energy of these pixels or else the energy of these pixels after filtering,
the prediction mode (intra prediction, inter prediction, default prediction producing a prediction for which no information is transmitted to the decoder ("skip"),
information specifying the type of prediction (orientation, reference image, etc.),
the type of subdivision of the current image zone,
the motion information if necessary,
the type of transform applied to the data of the current image zone, such as the discrete cosine transforms DCT, or else the discrete sine transforms DST,
the quantization step,
etc.

A parameter $P_u$ considered takes a plurality of values $V_{u1}, V_{u2}, \ldots, V_{um}, \ldots, V_{uN}$ ($1 \leq m \leq N$). It concerns for example:

the intra prediction mode of the HEVC standard which is associated with thirty-five different prediction directions,
the quantization step which is associated with fifty-two possible values,
the size of the block and its partitioning,
the type of transform applied to the residual prediction coefficients of the pixels of the current image zone if the latter is predicted in accordance with a given prediction mode, for example a DCT or DST of a given type or a transform defined by its coefficients,
etc.

In accordance with the invention, during a step C3a represented in FIG. 2A, for a current image parameter $P_u$ associated with the current image zone $B_i$, a method for coding the parameter $P_u$ is selected from at least two predetermined coding methods $MC_x$ and $MC_y$.

The step C3a is implemented by a selection device SEL_C represented in FIG. 3, which device is driven by the processor PROC_C.

According to an exemplary embodiment, only two coding methods $MC_x$ and $MC_y$ are made available to the coder CO.

More generally, and as represented in FIG. 3, the coding methods $MC_x$ and $MC_y$ belong to a set of W coding methods $MC_1, MC_2, \ldots, MC_x, \ldots, MC_y, \ldots, MC_W$ ($1 \leq x \leq y \leq W$) which is stored in the buffer memory MT_C of the coder CO. For a given value $V_{um}$ of an image parameter $P_u$ of the current image zone $B_i$, the W coding methods are adapted to associate with the value $V_{um}$ a code composed of W code words $MOC_{um1}, MOC_{um2}, \ldots, MOC_{umx}, \ldots, MOC_{umy}, \ldots, MOC_{umW}$ corresponding respectively to the W coding methods made available to the coder CO.

In accordance with the invention, the selection of a coding method out of at least two coding methods is a function of the value of at least one image parameter associated with a reference image zone which precedes the current image zone $B_i$.

According to one embodiment, the reference image zone is composed of a plurality of reference zones $BR_1, BR_2, \ldots, BR_s, \ldots, BR_Z$ ($1 \leq s \leq Z$) which have been coded before the current image zone $B_i$. Referring to FIG. 3, such reference zones $BR_1, BR_2, \ldots, BR_s, \ldots, BR_Z$ are stored in the buffer memory MT_C of the coder CO respectively in association with their corresponding sets of image parameters $EPR_1, EPR_2, \ldots, EPR_s, \ldots, EPR_Z$.

For example, the set $EPR_s$ of image parameters associated with the reference zone $BR_s$ contains a plurality of image parameters $PR_1, PR_2, \ldots, PR_k, \ldots, P_V$ ($1 \leq k \leq V$) of the type mentioned above in relation to the current image zone $B_i$.

In the example of FIG. 4A, the reference image zone contains two reference zones $BR_1$ and $BR_2$ which spatially precede the current image zone $B_i$ in the current image $IC_j$. The reference zone $BR_1$ is situated for example above the current image zone $B_i$. The reference zone $BR_2$ is situated for example to the left of the current image zone $B_i$.

The parameter of the reference zone is for example of the same type as the parameter $P_u$ of the current image zone $B_i$. That is to say that, for example, if the image parameter of the current image zone $B_i$ is the intra prediction mode, it is the intra prediction mode of the reference image zone which is considered.

According to another example, the parameter of the reference zone is of a type different from the type of the parameter $P_u$ of the current image zone $B_i$. That is to say that, for example, if the image parameter of the current image zone $B_i$ is the inter prediction mode, it is for example the index of the transform which has been applied to the data of the reference image zone which is considered.

Furthermore, the selection of the coding method can be implemented as a function of several parameters associated with a reference image zone. Thus, for example, if the image parameter of the current image zone $B_i$ is the transform, for example of the DCT or DST type, which has been applied to the pixels of the current image zone, the selection of the coding method to be applied to the index of this transform can be a function not only of the index of the transform applied to the pixels of the reference image zone, but also of the prediction mode associated with the latter.

In the example of FIG. 4B where the current image $IC_j$ forms part of a sequence of images, the reference image zone contains two reference zones $BR'_1$ and $BR'_2$ which temporally precede the current image zone $B_i$. To this end, the reference zones $BR'_1$ and $BR'_2$ are situated in an image other than the current image $IC_j$, such as, for example, the image $IC_{j-1}$ which was coded at an instant t−1 which immediately precedes the current instant t. The reference zone $BR'_1$ is situated for example above the reference image zone $BR_i$ corresponding, in the image $IC_{j-1}$, to the current image zone $B_i$. The reference zone $BR'_2$ is situated for example to the left of the reference image zone $BR_i$.

Referring again to FIG. 2A, during a step C4a, the value $V_{um}$ of the image parameter $P_u$ is coded using the selected coding method.

The step C4a is implemented by a coding device MC_C represented in FIG. 3, which device is driven by the processor PROC_C.

To this end, the value $V_{um}$ is associated with the code word $MOC_{selum}$ corresponding to the selected coding method $MC_{sel}$. If it is for example the coding method $MC_x$, the value $V_{um}$ of the current image parameter $P_u$ is associated with the code word $MOC_{xum}$ corresponding to the coding method $MC_x$ and stored in the buffer memory MT_C of the coder CO of FIG. 3. The code word $MOC_{xum}$ contains digital information, such as bits for example.

In the case where the current image parameter $P_u$ takes a plurality of values $V_{u1}, V_{u2}, \ldots, V_{um}, \ldots, V_{uN}$, the coding step C4a is iterated for each of these values.

At the end of the step C4a, N code words $MOC_{selu1}$, $MOC_{selu2}, \ldots, MOC_{selum}, \ldots, MOC_{seluN}$ corresponding to the selected coding method $MC_{sel}$ are therefore obtained.

During a step C5a represented in FIG. 2A, a data signal or stream $\phi_a$ is constructed containing one of the N code words $MOC_{selu1}, MOC_{selu2}, \ldots, MOC_{selum}, \ldots, MOC_{seluN}$ obtained at the end of the abovementioned step C4a. This is for example the code word $MOC_{selum}$.

The step C5a is implemented by a data signal construction device MCF, as represented in FIG. 3, which device is driven by the processor PROC_C.

The data signal $\phi_a$ is then delivered via the output SOR_C of the coder CO of FIG. 3. Such a signal is either stored in the buffer memory MT_C of the coder CO of FIG. 3, or transmitted by a communication network (not represented) to a remote terminal. The latter comprises a decoder which will be described later in the description.

The coding steps C3a to C5a which have just been described above are then implemented for each of the image parameters $P_1, P_2, \ldots, P_u, \ldots, P_M$ to be coded of the current image zone $B_i$.

The set of the steps C1a to C5a is then implemented for each of the image zones $B_1, B_2, \ldots, B_i, \ldots, B_F$ to be coded of the current image $IC_j$ considered, in a predetermined order which is for example the lexicographical order.

The fact that there are at least two coding methods for coding a current image parameter associated with a current image zone $B_i$ and that one is selected on the basis of one or more parameters of a reference image zone, which spatially or temporally precedes the current image zone $B_i$, makes it possible to obtain a code for which the quantity of information is substantially reduced compared to that contained in a code as obtained by the coding techniques implemented in the current video coders. It follows therefrom that the complexity in terms of computation resources of the coder CO of FIG. 3 is reduced and that the signal $\phi_a$ delivered at the output of the coder CO is less costly in terms of bit rate.

According to an exemplary embodiment, the reduction in terms of bit rate can be augmented by implementing, in the image parameter coding device MC_C of FIG. 3, a CABAC coding on the code word $MOC_{selum}$ or else on at least one or more of the code words $MOC_{selu1}$, $MOC_{selu2}$, ..., $MOC_{selum}$, ..., $MOC_{seluN}$ if the current image parameter $P_u$ takes N values.

Referring to FIG. 2B, another embodiment of the coding method of the invention is described. According to this other embodiment, the current image parameter $P_u$ takes N values $V_{u1}, V_{u2}, \ldots, V_{um}, \ldots, V_{uN}$ (1≤m≤N).

The steps C1b to C3b are the same as the steps C1a to C3a of FIG. 2A and will not be described again in detail.

The coding method of FIG. 2B further comprises a step C4b during which the coding device MC_C of FIG. 3 applies a coding of only K values $V_{u1}, V_{u2}, \ldots, V_{um}, \ldots, V_{uK}$ out of N values of the current image parameter $P_u$, such as 1≤K<N, using the coding method selected in C3b.

At the end of the step C4b, K code words $MOC_{selu1}$, $MOC_{selu2}, \ldots, MOC_{selum}, \ldots, MOC_{seluK}$ corresponding to the selected coding method $MC_{sel}$ are therefore obtained.

During a step C5b represented in FIG. 2B, the device MCF of FIG. 3 proceeds to construct a data signal 4 which contains one of the K code words $MOC_{selu1}$, $MOC_{selu2}, \ldots, MOC_{selum}, \ldots, MOC_{seluK}$ obtained at the end of the abovementioned step C4b. One of said K code words signaled is for example the code word $MOC_{selum}$.

Such an embodiment makes it possible to optimize the reduction of the signaling cost.

According to another embodiment in which the current image parameter $P_u$ takes N values $V_{u1}, V_{u2}, \ldots, V_{um}, \ldots, V_{uN}$ (1≤m≤N), the step C4a or C4b comprises, referring to FIG. 2C, a substep C41 during which the coding device MC_C determines:
  a number Q of the least probable values, such as 1≤Q<N or else 1≤Q<K, and
  a number N−Q or else K−Q of the most probable values of the current image parameter $P_u$.

During a substep C42, the coding device MC_C of FIG. 3 then associates:
  with the Q values, respectively Q code words of one and the same predetermined length $l_Q$,
  with the other N−Q values (FIG. 2A) or K−Q values (FIG. 2B), respectively N−Q code words or N−K code words, of respective length $l_1, l_2, \ldots, l_{N-Q}$ or $l_1, l_2, \ldots, l_{K-Q}$, less than the length $l_Q$ of the Q code words.

If, for example, a code word is composed of a plurality of bits, the length of this code word is composed of the number of bits contained in the code word considered.

The embodiment of FIG. 2C thus makes it possible to optimize the reduction of the cost of signaling of the signal $\phi_a$ or $\phi_b$, which reduction is coupled with an estimation of the bit rate that is easier to calculate given the fact that the N–Q or K–Q least probable values of the current image parameter $P_u$ are associated with code words which are of the same length.

There now follows a description of an exemplary embodiment of the invention, in which the current image parameter $P_u$ is the HEVC intra mode. The parameter $P_u$ therefore takes thirty-five values $V_{u1}$ to $V_{u35}$ which correspond respectively to the thirty-five prediction direction indices proposed in HEVC.

In the example represented, the current image zone $B_i$ is a block of 8×8 size as represented in FIG. 4A. The reference image zone considered comprises the two blocks $BR_1$ and $BR_2$ illustrated in FIG. 4A which are for example each of 4×4 size.

In accordance with the invention, it is proposed to select a coding method out of two coding methods $MC_1$ and $MC_2$ made available to the coder CO of FIG. 3, as a function of the results of the application of a test to the values of the intra prediction mode A of the block $BR_1$ and of the intra prediction mode B of the block $BR_2$.

Figure 5:
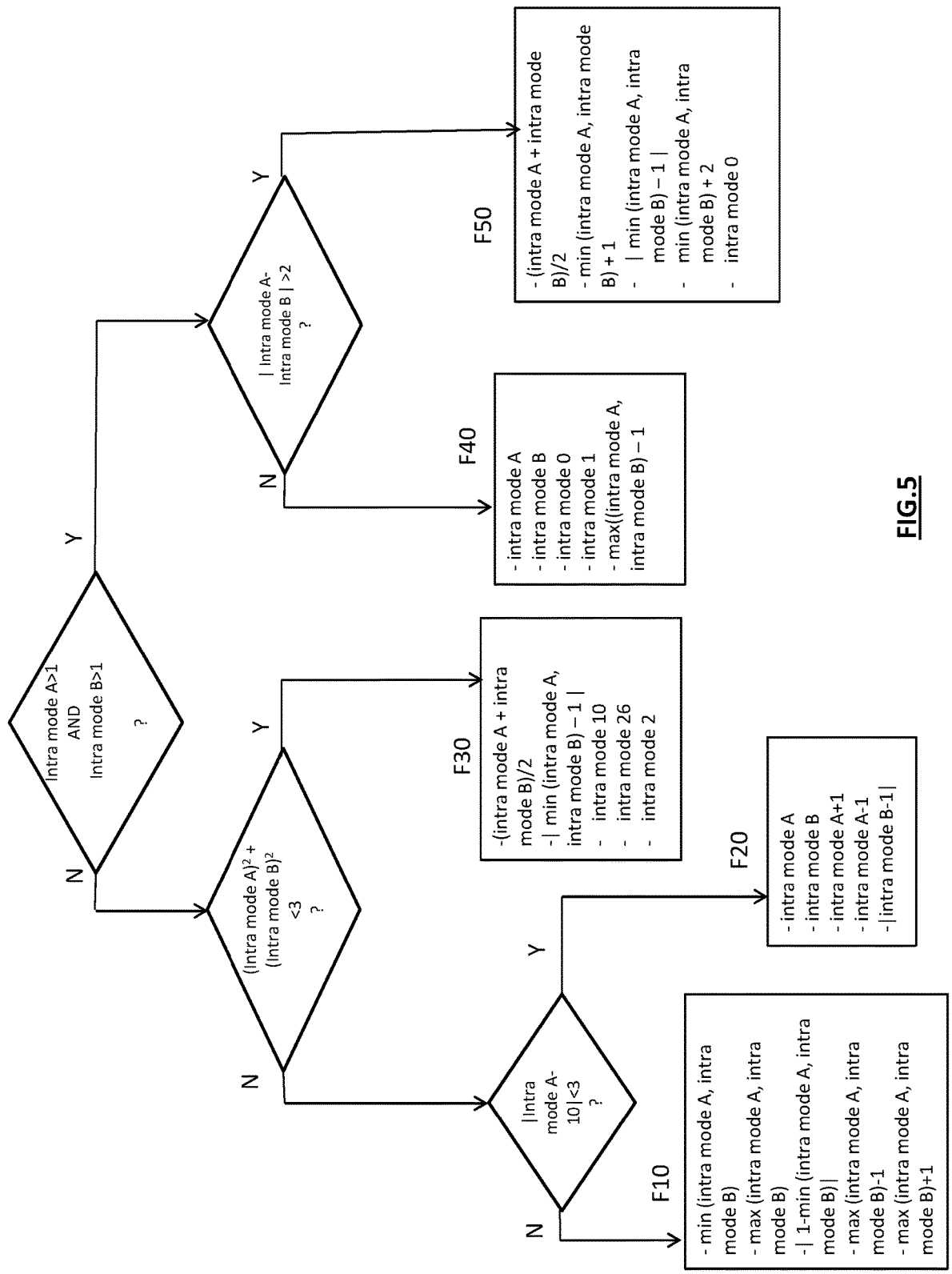
FIG. 5 represents an example of testing of current image parameter values implemented according to the invention.

Such a test is for example implemented using a decision tree represented in FIG. 5. This tree distinguishes five possible cases. In other words, it partitions the possible cases. Approaches other than those based on trees are possible, for example based on the standard classification, or "clustering", techniques (hyperplan subdivision, parametric regions, etc.). According to the values of the intra prediction mode A of the block $BR_1$ and of the intra prediction mode B of the block $BR_2$, the decision tree makes it possible to determine five more probable values $MPM_0$ to $MPM_4$ of intra prediction modes for the current block $B_i$, out of the thirty-five possible values of the intra mode as proposed in the HEVC standard, according to five different ways represented respectively by the five lowest leaves F10, F20, F30, F40, F50 of the tree. The number of more probable intra prediction mode values is, here, higher than the number, set at three, of more probable intra prediction modes retained conventionally in HEVC.

Thus:
the leaf F10 associates with the intra prediction mode of the current block the following five most probable values:
$MPM_0$=min (intra mode A, intra mode B)
$MPM_1$=max (intra mode A, intra mode B)
$MPM_2$=|1−min (intra mode A, intra mode B)|
$MPM_3$=max (intra mode A, intra mode B)−1
$MPM_4$=max (intra mode A, intra mode B)+1
the leaf F20 associates with the intra prediction mode of the current block the following five most probable values:
$MPM_0$=intra mode A
$MPM_1$=intra mode B
$MPM_2$=intra mode A+1
$MPM_3$=intra mode A−1
$MPM_4$=|intra mode B−1|
the leaf F30 associates with the intra prediction mode of the current block the following five most probable values:
$MPM_0$=(intra mode A+intra mode B)/2
$MPM_1$=|min (intra mode A, intra mode B)−1|
$MPM_2$=intra mode 10
$MPM_3$=intra mode 26
$MPM_4$=intra mode 2
the leaf F40 associates with the intra prediction mode of the current block the following five most probable values:
$MPM_0$=intra mode A
$MPM_1$=intra mode B
$MPM_2$=intra mode 0
$MPM_3$=intra mode 1
$MPM_4$=max (intra mode A, intra mode B)−1
the leaf F50 associates with the intra prediction mode of the current block the following five most probable values:
$MPM_0$=(intra mode A+intra mode B)/2
$MPM_1$=min (intra mode A, intra mode B)+1
$MPM_2$=|min (intra mode A, intra mode B)−1|
$MPM_3$=min (intra mode A, intra mode B)+2
$MPM_4$=intra mode 0.
According to the invention:
for the leaves F10, F20 and F40, the respective values of the thirty-five intra prediction modes are coded as follows in accordance with the first method $M_{C1}$:
the value of the first most probable intra prediction mode $MPM_0$ is associated with a code word of two bits,
the value of the second most probable intra prediction mode $MPM_1$ is associated with a code word of three bits,
the value of the third most probable intra prediction mode $MPM_2$ is associated with a code word of four bits,
the value of the fourth most probable intra prediction mode $MPM_3$ is associated with a code word of four bits,
the value of the fifth most probable intra prediction mode $MPM_4$ is associated with a code word of five bits,
the value of the each of the thirty remaining prediction modes $MPM_5$ to $MPM_{34}$ is associated with a code word of six bits,
for the leaves F30 and F50, the respective values of the thirty-five intra prediction modes are coded as follows in accordance with the second method $MC_2$:
the value of the first most probable intra prediction mode $MPM_0$ is associated with a code word of one bit,
the value of the second most probable intra prediction mode $MPM_1$ is associated with a code word of three bits,
the value of the third most probable intra prediction mode $MPM_2$ is associated with a code word of four bits,
the value of the fourth most probable intra prediction mode $MPM_3$ is associated with a code word of four bits,
the value of the fifth most probable intra prediction mode $MPM_4$ is associated with a code word of six bits,
the value of each of the thirty remaining prediction modes $MPM_5$ to $MPM_{34}$ is associated with a code word of seven bits.

In this example, a CABAC coding is not applied to one or more of the code words obtained. It has moreover been calculated that the obtained average number of bits to be transmitted is equal to 3.72 bits, which makes it possible to save 0.29 bits for each intra prediction mode signaled relative to the average number of bits obtained with HEVC which is 4.01 bits.

If a CABAC coding is applied to the first bit of each of the code words obtained in accordance with one of the coding methods $MC_1$ and $MC_2$, it has been calculated that the obtained average number of bits to be transmitted is equal to 3.68 bits, which makes it possible to save 0.27 bits for each intra prediction mode signaled relative to the average number of bits obtained with a CABAC coding implemented in HEVC, which is 3.95 bits.

In another embodiment, the availability of the blocks neighboring the current block is assessed. Thus, according to this other embodiment, a parameter other than the prediction mode assists in the determination of the most probable prediction modes. In this embodiment, according to a first variant, if the reference blocks $BR_1$ and $BR_2$ are available, then the decision tree according to FIG. 5 will be implemented. If just one of the reference blocks $BR_1$ and $BR_2$ is available, according to a first predetermined coding method $MC_1$, the following three most probable values are associated with the intra prediction mode of the current block:

$MPM_0$=intra mode A (if $BR_1$ available)/intra mode B (if $BR_2$ available)
$MPM_1$=intra mode 0
$MPM_2$=intra mode 1.

The respective values of the thirty-five intra prediction modes are coded as follows in accordance with the first method $MC_1$:

the value of the first most probable intra prediction mode $MPM_0$ is associated with a code word of two bits,
the value of the second most probable intra prediction mode $MPM_1$ is associated with a code word of three bits,
the value of the third most probable intra prediction mode $MPM_2$ is associated with a code word of three bits,
the value of each of the thirty-two remaining prediction modes $MPM_3$ to $MPM_{34}$ is associated with a code word of six bits.

According to a second variant of this embodiment, if the reference blocks $BR_1$ and $BR_2$ are both unavailable, according to a second predetermined coding method $MC_2$, the following three most probable values are associated with the intra prediction mode of the current block:

$MPM_0$=intra mode 0
$MPM_1$=intra mode 1
$MPM_2$=intra mode 26.

The respective values of the thirty-five intra prediction modes are coded according to the same number of bits as the first method $MC_1$ above.

According to a variant of the embodiment which has just been described, when the reference blocks $BR_1$ and $BR_2$ are both available and, in addition, the prediction mode A of the block $BR_1$ and the prediction mode B of the block $BR_2$ are both equal to 1, then an advantageous signaling mode is employed. In this case, according to a third predetermined coding method $MC_3$, the following four most probable values are associated with the intra prediction mode of the current block:

$MPM_0$=intra mode 1
$MPM_1$=intra mode 0
$MPM_2$=intra mode 10
$MPM_4$=intra mode 26.

The respective values of these four intra prediction modes are coded as follows in accordance with the third coding method $MC_3$:

the value of the first most probable intra prediction mode $MPM_0$ is associated with a code word of one bit, i.e. 0,
the value of the second most probable intra prediction mode $MPM_1$ is associated with a code word of two bits, i.e. 10,
the value of the third most probable intra prediction mode $MPM_2$ is associated with a code word of three bits, i.e. 110,
the value of the fourth most probable intra prediction mode $MPM_3$ is associated with a code word of three bits, i.e. 111.

Thus, only K=4 prediction mode values out of N=35 are coded according to the third coding method $MC_3$. A particularly targeted code is therefore employed in this case, which makes it possible to substantially reduce the bit rate. When the reverse condition is fulfilled, that is to say that the prediction mode A of the block $BR_1$ and the prediction mode B of the block $BR_2$ are both different from 1, then a tree according to FIG. 5 is employed.

DETAILED DESCRIPTION OF THE DECODING PART

An embodiment of the invention will now be described, in which the decoding method according to the invention is used to decode a data signal or stream representative of an image parameter which is capable of being decoded by a decoder according to any one of the current or future video decoding standards.

Figure 6:
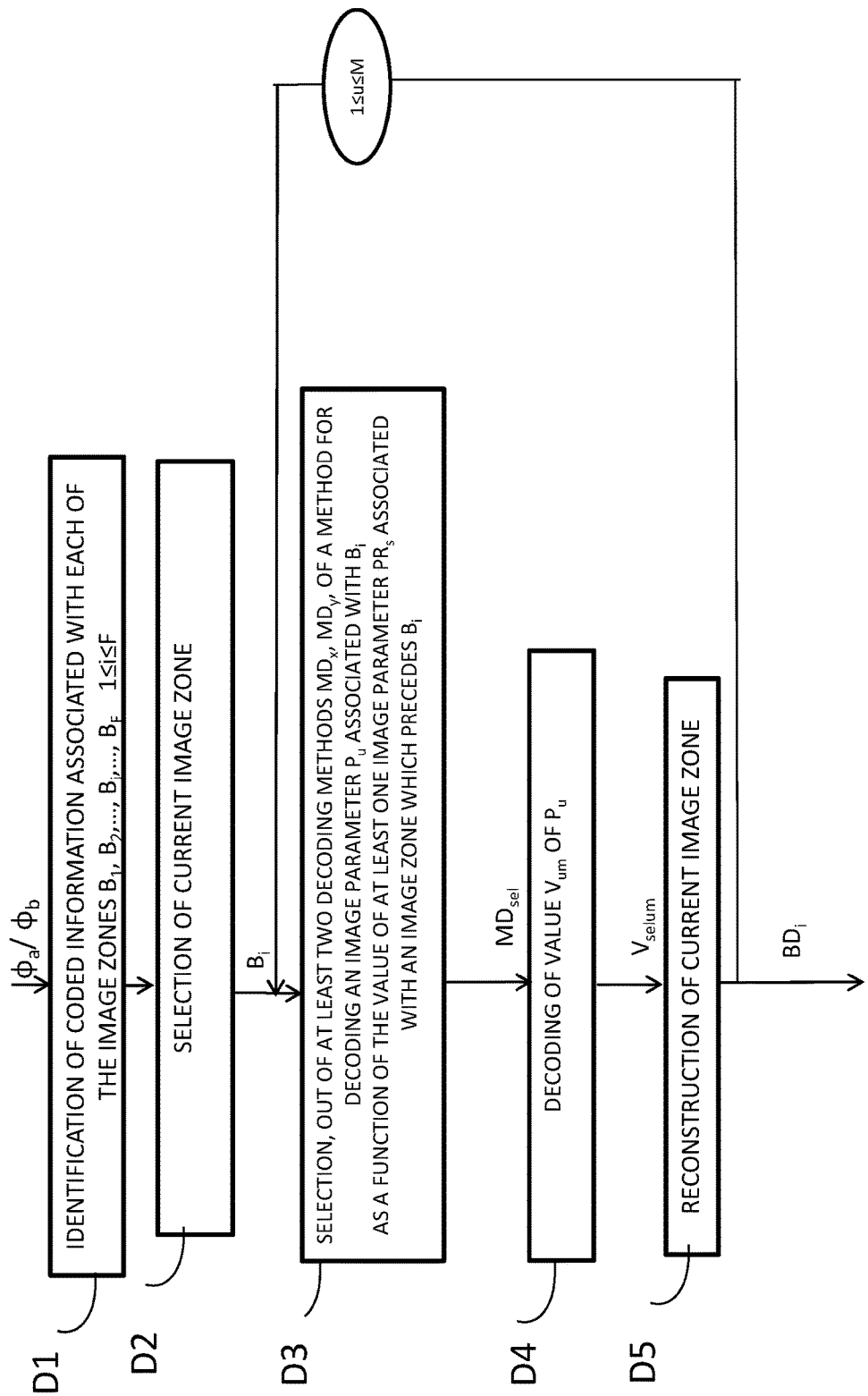
FIG. 6 represents the main steps of the method for decoding an image parameter according to an embodiment of the invention.

In this embodiment, the decoding method according to the invention is for example implemented by software or hardware through modifications of a decoder initially conforming to one of said standards. The decoding method according to the invention is represented in the form of an algorithm comprising steps D1 to D5 as represented in FIG. 6.

Figure 7:
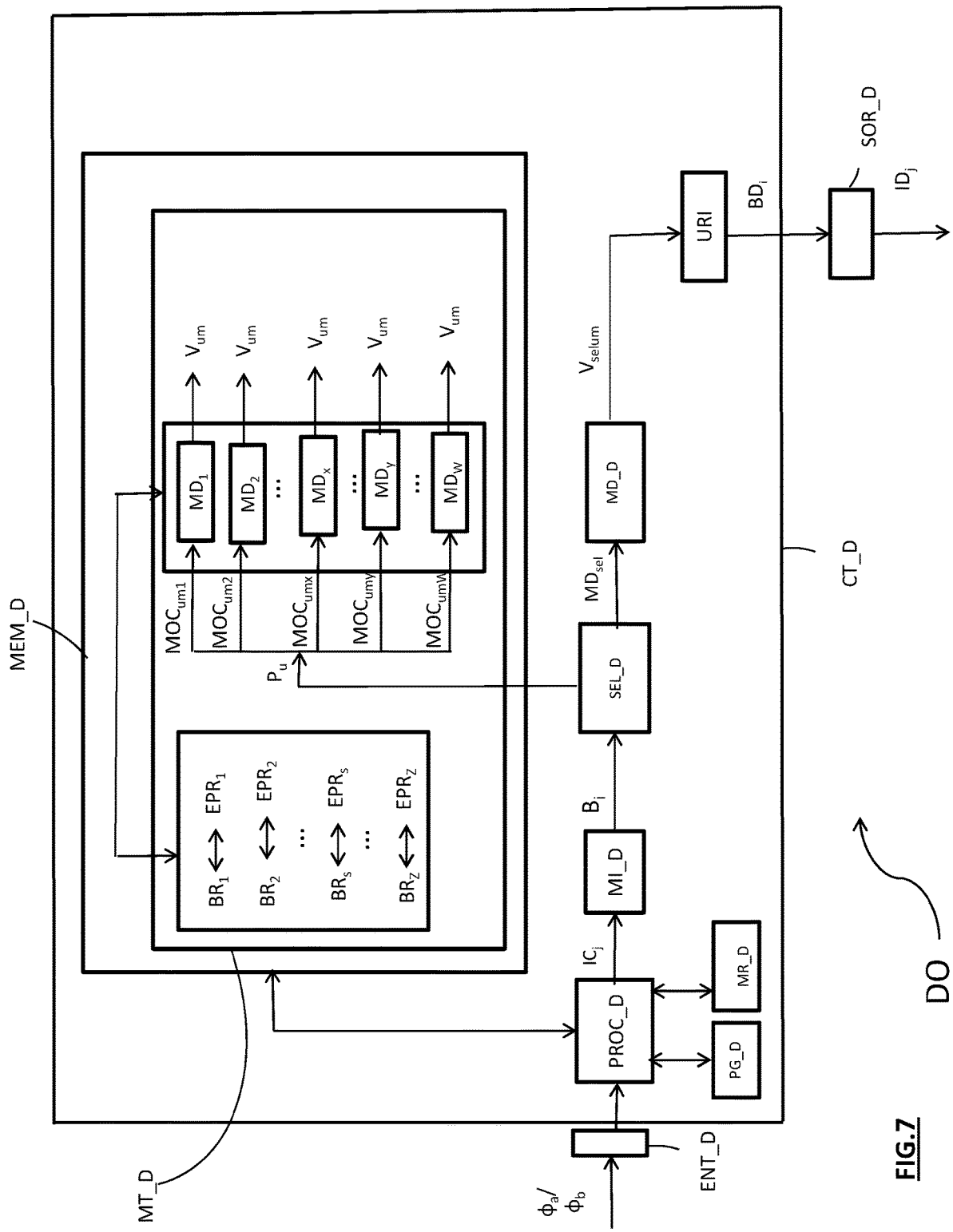
FIG. 7 represents an embodiment of a decoder implementing an image parameter decoding method according to FIG. 6.

According to the embodiment of the invention, the decoding method according to the invention is implemented in a decoding device DO represented in FIG. 7.

As illustrated in FIG. 7, such a decoder device comprises:
an input ENT_D for receiving the current stream or data signal $\phi_a$ (FIG. 2A) or $\phi_b$ (FIG. 2B) to be decoded,
a processing circuit CT_D for implementing the decoding method according to the invention, the processing circuit CT_D containing:
a memory MEM_D comprising a buffer memory MT_D,
a processor PROC_D driven by a computer program PG_D,
an output SOR_D for delivering a reconstructed current image containing the image parameters decoded at the end of the decoding according to the method of the invention.

On initialization, the code instructions of the computer program PG_D are for example loaded into a RAM memory, MR_D, before being executed by the processing circuit CT_D.

The decoding method represented in FIG. 6 is applied to any parameter associated with a current image $IC_j$ to be decoded which can be a fixed image or else an image forming part of a sequence of images $IC_1, IC_2, \ldots, IC_j, \ldots, IC_G$, ($1 \le j \le G$), some of these images being decoded in relation to others.

To this end, information representative of the current image $IC_j$ to be decoded is identified in the data signal $\phi_a$ or $\phi_b$ received at the input ENT_D of the decoder DO and as delivered at the end of the coding method of FIG. 2A or 2B.

Referring to FIG. 6, during a step D1, in a way known per se, the information associated with each of the image zones $B_1, B_2, \ldots, B_i, \ldots, B_F$ coded previously in accordance with the abovementioned lexicographical order is determined in the signal $\phi_a$ or $\phi_b$.

Such a determination step D1 is implemented by a stream analysis device MI_D, such as represented in FIG. 7, which device is driven by the processor PROC_D.

Types of progress other than that mentioned above are of course possible and depend on the order of progress chosen in the coding.

According to an exemplary embodiment, said image zones to be decoded are rectangular or square blocks.

According to another exemplary embodiment, the zones of the image to be decoded are matched to the local characteristics of the image, such as, for example, a uniform texture, a constant motion, an object in the foreground in the image, etc.

During a step D2 represented in FIG. 6, the decoder DO selects, as current image zone, a first zone to be decoded $B_i$ of the image $IC_j$, such as, for example, the first zone $B_1$.

In the example represented in FIG. 4A or 4B, the current image zone $B_i$ is a block of 8×8 pixel size.

Conventionally, the current image zone $B_i$ is associated with a plurality of image parameters $P_1, P_2, \ldots, P_u, \ldots, P_M$, such as $1 \leq u \leq M$.

Such parameters are for example:
the residual prediction coefficients of the pixels of the current image zone if the latter is predicted in accordance with a given prediction mode,
the values of pixels constituting the current image zone considered as such or through a characteristic computation operation, such as, for example, the average or the energy of these pixels or else the energy of these pixels after filtering,
the prediction mode (intra prediction, inter prediction, default prediction producing a prediction for which no information is transmitted to the decoder ("skip"),
information specifying the type of prediction (orientation, reference image, etc.),
the type of subdivision of the current image zone,
the motion information if necessary,
the type of transform applied to the data of the current image zone, such as the discrete cosine transforms DCT or else the discrete sine transforms DST,
the quantization step,
etc.

A parameter $P_u$ considered takes a plurality of values $V_{u1}, V_{u2}, \ldots, V_{u2}, \ldots, V_{um}, \ldots, V_{uN}$ ($1 \leq m \leq N$). It concerns for example:
the intra prediction mode of the HEVC standard which is associated with thirty-five different prediction directions,
the quantization step which is associated with fifty-two possible values,
the size of the block and its partitioning,
the type of transform applied to the residual prediction coefficients of the pixels of the current image zone if the latter is predicted in accordance with a given prediction mode, for example a DCT or DST of a given type or a transform defined by its coefficients,
etc.

According to the invention, during a step D3 represented in FIG. 6, for a current image parameter $P_u$ associated with the current image zone $B_i$, a method for decoding the parameter $P_u$, is selected from at least two predetermined decoding methods $MD_x$ and $MD_y$.

The step D3 is implemented by a selection device SEL_D represented in FIG. 7, which device is driven by the processor PROC_D.

According to an exemplary embodiment, only two decoding methods $MD_x$ and $MD_y$ are made available to the decoder DO.

More generally and in a way corresponding to the coder CO of FIG. 3, as represented in FIG. 7, the decoding methods $MD_x$ and $MD_y$ belong to a set of W decoding methods $MD_1, MD_2, \ldots, MD_x, \ldots, MD_y, \ldots, MD_W$ ($1 \leq x \leq y \leq W$) which is stored in the buffer memory MT_D of the decoder DO. For a given value $V_{um}$ of an image parameter $P_u$ of the current image zone $B_i$, the W decoding methods are adapted to reconstruct the value $V_{um}$ from W code words $MOC_{um1}, MOC_{um2}, \ldots, MOC_{umx}, \ldots, MOC_{umy}, \ldots, MOC_{umW}$ corresponding respectively to the W decoding methods made available to the decoder DO.

In accordance with the invention, the selection of a decoding method out of at least two decoding methods is a function of the value of at least one image parameter associated with a reference image zone which precedes the current image zone $B_i$.

According to one embodiment, the reference image zone is composed of a plurality of reference zones $BR_1, BR_2, \ldots, BR_s, \ldots, BR_Z$ ($1 \leq s \leq Z$) which have been decoded before the current image zone $B_i$. Referring to FIG. 7, such reference zones $BR_1, BR_2, \ldots, BR_s, \ldots, BR_Z$ are stored in the buffer memory MT_D of the decoder DO respectively in association with their corresponding sets of image parameters $EPR_1, EPR_2, \ldots, EPR_s, \ldots, EPR_Z$.

For example, the set $EPR_s$ of image parameters associated with the reference zone $BR_s$ contains a plurality of image parameters $PR_1, PR_2, \ldots, PR_k, \ldots, P_V$ ($1 \leq k \leq V$) of the type mentioned above in relation to the current image zone $B_i$.

In the same way as for the coder CO of FIG. 3, the parameter of the reference zone is for example of the same type as the parameter $P_u$ of the current image zone $B_i$ or even of a different type. Examples of these parameters have already been given above, in relation to the description of the coding method of FIGS. 2A to 2C.

Furthermore, still in a way corresponding to the coding described above, the selection of the decoding method can be implemented as a function of several parameters associated with the reference image zone.

Referring again to FIG. 6, during a step D4, the value $V_{um}$ of the image parameter $P_u$ is decoded using the selected decoding method.

The step D4 is implemented by a decoding device MD_D represented in FIG. 7, which device is driven by the processor PROC_D.

To this end, the code word $MOC_{selum}$ associated with the value $V_{um}$ at the end of the coding step C4a of FIG. 2A or else C4b of FIG. 2B is decoded using the decoding method $MD_{sel}$ selected out of the decoding methods $MD_1$ to $MD_W$. If it is for example the decoding method $MD_x$, the code word $MOC_{xum}$ identified in the stream $\phi_a$ or $\phi_b$ is decoded using the decoding method $MD_x$ in accordance with the association stored in the buffer memory MT_D of the decoder DO of FIG. 7, in order to reconstruct the value $V_{um}$ of the current image parameter $P_u$. The code word $MOC_{xum}$ contains digital information, such as bits for example.

The decoding steps D3 and D4 which have just been described above are then implemented for each of the parameters $P_1, P_2, \ldots, P_u, \ldots, P_M$ to be reconstructed of the current image zone $B_i$.

During a step D5 represented in FIG. 6, the current block $B_i$ is reconstructed and the latter is written into a decoded image $ID_j$.

Such a step is implemented by an image reconstruction device URI as represented in FIG. 7, said device being driven by the processor PROC_D.

The set of the steps D1 to D5 of FIG. 6 is then implemented for each of the image zones $B_1, B_2, \ldots, B_i, \ldots,$ $B_F$ to be decoded of the current image $IC_j$ considered, in a predetermined order which is, for example, lexicographical order.

According to an exemplary embodiment, the reduction of the computation resources of the decoder DO of FIG. 7 can be augmented by implementing, in the image parameter decoding device MD_D, a CABAC decoding on the code word $MOC_{selum}$ written into the stream $\phi_a$ or else on at least one or more of the code words $MOC_{selu1}$, $MOC_{selu2}$, ..., $MOC_{selum}$, ..., $MOC_{seluN}$ written into the stream $\phi_a$ if the current image parameter $P_u$ takes N values.

Such an embodiment makes it possible to optimize the reduction of the complexity of the computations of the decoder DO.

It goes without saying that the embodiments which have been described above have been given in a purely indicative and nonlimiting manner, and that many modifications can easily be made by the person skilled in the art without thereby departing from the scope of the invention.

What is claimed is:

1. A method for coding at least one current image parameter, relative to a zone of a current image, N possible values being associated with said at least one current image parameter, wherein N≥2, and wherein the method comprises the following acts performed by a coding device:
   as a function of a value of at least one parameter of an image zone which precedes said zone of the current image, selecting a method for coding said at least one current image parameter, out of at least two predetermined coding methods; and
   coding the value of said at least one current image parameter using the selected coding method, the selected coding method matching K code words respectively to K values out of said N possible values, wherein K<N.

2. The coding method as claimed in claim 1, wherein:
   Q code words all having the same length are associated respectively with some Q possible values out of N of said at least one current image parameter, Q<N,
   N–Q or K–Q code words, of respective length less than that of the Q code words, are associated respectively with the N–Q or K–Q possible remaining values of said at least one current image parameter.

3. A device for coding at least one current image parameter, N possible values being associated with said at least one current image parameter, wherein N≥2, the device comprising:
   a processing circuit that it is arranged to, relative to a zone of a current image:
   as a function of the value of at least one parameter of an image zone which precedes said zone of the current image, select a method for coding said at least one current image parameter, out of at least two predetermined coding methods,
   code the value of said at least one current image parameter using the selected coding method, the selected coding method matching K code words respectively to K values out of said N possible values, wherein K<N.

4. A non-transitory computer-readable storage medium on which is stored a computer program comprising program code instructions for coding at least one current image parameter when the instructions are executed by a processing circuit of a coding device, N possible values being associated with said at least one current image parameter, wherein N≥2, wherein the instructions configure the coding device to perform acts comprising, relative to a zone of a current image:
   as a function of a value of at least one parameter of an image zone which precedes said zone of the current image, selecting a method for coding said at least one current image parameter, out of at least two predetermined coding methods; and
   coding the value of said at least one current image parameter using the selected coding method, the selected coding method matching K code words respectively to K values out of said N possible values, wherein K<N.

5. A method for decoding at least one current image parameter, relative to a zone of a current image, N possible values being associated with said at least one current image parameter, wherein N≥2, the method comprises the following acts performed by a decoding device:
   as a function of the value of at least one parameter of an image zone which precedes said zone of the current image, selecting a method for decoding said at least one current image parameter, out of at least two predetermined decoding methods; and
   decoding the value of said at least one current image parameter using the selected decoding method, the selected decoding method matching K code words respectively to K values out of said N possible values, wherein K<N.

6. The decoding method as claimed in claim 5, wherein:
   Q code words all having the same length are associated respectively with some Q possible values out of N of said at least one current image parameter, Q<N,
   N–Q or K–Q code words, of respective length less than that of the Q code words, are associated respectively with the N–Q or K–Q possible remaining values of said at least one current image parameter.

7. A device for decoding at least one current image parameter, N possible values being associated with said at least one current image parameter, wherein N≥2, the device comprising:
   a processing circuit that it is arranged to, relative to a zone of a current image:
   as a function of the value of at least one parameter of an image zone which precedes said zone of the current image, select a method for decoding said at least one current image parameter, out of at least two predetermined decoding methods; and
   decode the value of said at least one current image parameter using the selected decoding method, the selected decoding method matching K code words respectively to K values out of said N possible values, wherein K<N.

8. A non-transitory computer-readable storage medium on which is stored a computer program comprising program code instructions for decoding at least one current image parameter when the instructions are executed by a processing circuit of a decoding device, N possible values being associated with said at least one current image parameter, wherein N≥2, wherein the instructions configure the decoding device to perform acts comprising, relative to a zone of a current image:
   as a function of the value of at least one parameter of an image zone which precedes said zone of the current image, selecting a method for decoding said at least one current image parameter, out of at least two predetermined decoding methods; and
   decoding the value of said at least one current image parameter using the selected decoding method, the selected decoding method matching K code words respectively to K values out of said N possible values, wherein K<N.

* * * * *